United States Patent
Ashworth et al.

(10) Patent No.: US 11,201,664 B2
(45) Date of Patent: Dec. 14, 2021

(54) ADJUSTING REPEATER GAIN BASED ON ANTENNA FEEDBACK PATH LOSS

(71) Applicant: Wilson Electronics, LLC, St. George, UT (US)

(72) Inventors: Christopher Ken Ashworth, Toquerville, UT (US); Patrick Lee Cook, Cedar City, UT (US); Dale Robert Anderson, Colleyville, TX (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 16/859,890

(22) Filed: Apr. 27, 2020

(65) Prior Publication Data

US 2020/0343964 A1   Oct. 29, 2020

Related U.S. Application Data

(60) Provisional application No. 62/840,270, filed on Apr. 29, 2019.

(51) Int. Cl.
*H04B 7/155* (2006.01)
*H04B 17/14* (2015.01)
(Continued)

(52) U.S. Cl.
CPC ......... *H04B 7/15535* (2013.01); *H04B 17/14* (2015.01); *H04B 17/24* (2015.01); *H04B 17/40* (2015.01)

(58) Field of Classification Search
CPC .............................................. H04B 7/15535
See application file for complete search history.

(56) References Cited

U.S. PATENT DOCUMENTS 4,776,032 A  10/1988 Odate et al.
5,303,395 A   4/1994 Dayani
(Continued)

FOREIGN PATENT DOCUMENTS

EP    1525678 B1   7/2008

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.
(Continued)

*Primary Examiner* — Hsinchun Liao
(74) *Attorney, Agent, or Firm* — Thorpe North & Western, LLP.

(57) ABSTRACT

Technology for a repeater is disclosed. The repeater can include a first port and a second port. The repeater can include a transmitter communicatively coupled to the first port and a receiver communicatively coupled to the second port. The transmitter can transmit a path loss signal. The receiver can receive the path loss signal transmitted by the transmitter. The repeater can include a controller. The controller can identify a first power level of the signal transmitted from the transmitter. The controller can identify a second power level of the signal received at the receiver. The controller can determine an antenna feedback path loss of the repeater based on the first power level and the second power level. The controller can set a maximum gain level for the repeater based on the antenna feedback path loss to avoid an oscillation in the repeater.

26 Claims, 8 Drawing Sheets

(51) Int. Cl.
*H04B 17/24* (2015.01)
*H04B 17/40* (2015.01)

(56) References Cited

U.S. PATENT DOCUMENTS

| | | | |
|---|---|---|---|
| 5,737,687 A | 4/1998 | Martin et al. | |
| 5,777,530 A | 7/1998 | Nakatuka | |
| 5,835,848 A | 11/1998 | Bi et al. | |
| 6,005,884 A | 12/1999 | Cook et al. | |
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,974,573 B2 | 7/2011 | Dean | |
| 2002/0044594 A1 | 4/2002 | Bongfeldt | |
| 2003/0123401 A1 | 7/2003 | Dean | |
| 2004/0095992 A1 | 5/2004 | Balaberda | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1* | 6/2005 | Allen | H04B 7/15578 455/13.4 |
| 2006/0084379 A1* | 4/2006 | O'Neill | H04B 7/2606 455/25 |
| 2007/0071128 A1 | 3/2007 | Meir et al. | |
| 2007/0188235 A1 | 8/2007 | Dean | |
| 2008/0081555 A1 | 4/2008 | Kong et al. | |
| 2008/0096483 A1 | 4/2008 | Van Buren et al. | |
| 2008/0278237 A1 | 11/2008 | Blin | |
| 2009/0285147 A1 | 11/2009 | Subasic et al. | |
| 2010/0316092 A1* | 12/2010 | Hannan | H04B 7/15535 375/142 |
| 2011/0151775 A1 | 6/2011 | Kang et al. | |
| 2016/0259061 A1* | 9/2016 | Carter | G01S 19/11 |
| 2018/0375565 A1 | 12/2018 | Ashworth | |

OTHER PUBLICATIONS

ADL5513; "1 MHz to 4 GHz, 80 dB Logarithmic Detector/Controller"; Data Sheet; (2008); 12 pages; Analog Devices, Inc.
HMC713LP3E; "54 dB, Logarithmic Detector / Controller, 50-8000 MHz"; Data Sheet; (2010); 12 pages.
HMC909LP4E; "RMS Power Detector Single-Ended, DC—5.8 GHz"; Data Sheet; (2010); 21 pages.
PIC16F873; "28/40-Pin 8-Bit CMOS FLASH Microcontrollers"; (2001); Data Sheet; 218 pages.

* cited by examiner

ADJUSTING REPEATER GAIN BASED ON ANTENNA FEEDBACK PATH LOSS

RELATED APPLICATIONS

The present application claims the benefit of U.S. Provisional Patent Application No. 62/840,270, filed Apr. 29, 2019 with a docket number of 3969-179.PROV, the entire specification of which is hereby incorporated by reference in its entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
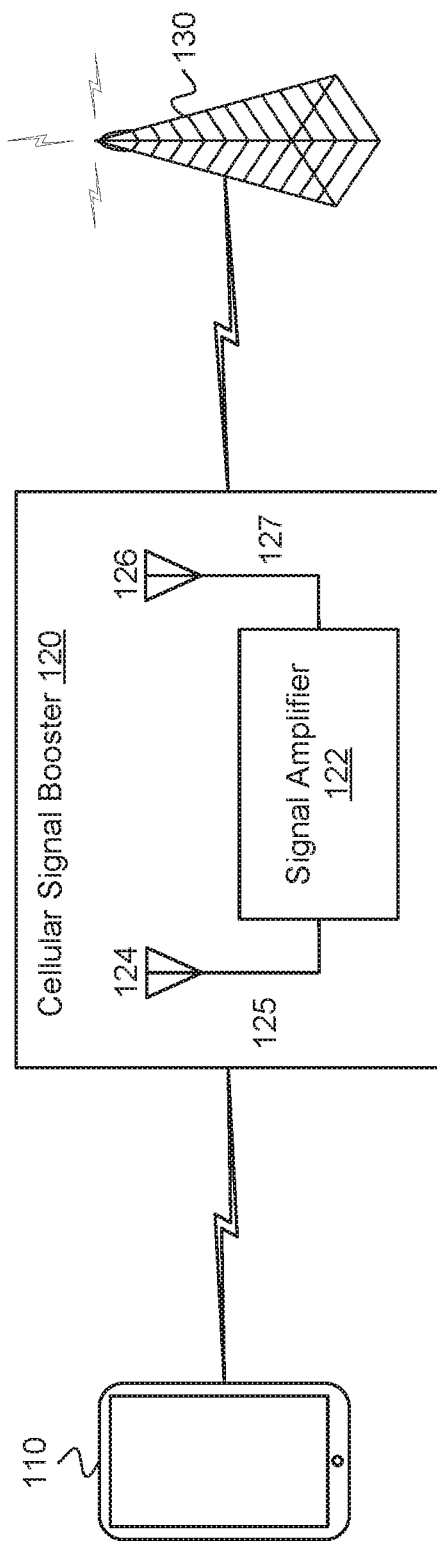
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster, also referred to as a repeater 120, can be a Federal Communications Commission (FCC)-compatible consumer repeater. As a non-limiting example, the repeater 120 can be compatible with FCC Part 20 or 47 Code of Federal Regulations (C.F.R.) Part 20.21 (Mar. 21, 2013). In addition, the handheld booster can operate on the frequencies used for the provision of subscriber-based services under parts 22 (Cellular), 24 (Broadband PCS), 27 (AWS-1, 700 megahertz (MHz) Lower A-E Blocks, and 700 MHz Upper C Block), and 90 (Specialized Mobile Radio) of 47 C.F.R. The repeater 120 can be configured to automatically self-monitor its operation to ensure compliance with applicable noise and gain limits. The repeater 120 can either self-correct or shut down automatically if the repeater's operations violate the regulations defined in 47 CFR Part 20.21. While a repeater that is compatible with FCC regulations is provided as an example, it is not intended to be limiting. The repeater can be configured to be compatible with other governmental regulations based on the location where the repeater is configured to operate.

In one configuration, the repeater 120 can improve the wireless connection between the wireless device 210 and the base station 230 (e.g., cell tower) or another type of wireless wide area network (WWAN) access point (AP) by amplifying desired signals relative to a noise floor. The repeater 120 can boost signals for cellular standards, such as the Third Generation Partnership Project (3GPP) Long Term Evolution (LTE) Release 8, 9, 10, 11, 12, 13, 14, 15, or 16 standards or Institute of Electronics and Electrical Engineers (IEEE) 802.16. In one configuration, the repeater 120 can boost signals for 3GPP LTE Release 16.1.0 (March 2019) or other desired releases.

The repeater 120 can boost signals from the 3GPP Technical Specification (TS) 36.101 (Release 16 Jan. 2019) bands, referred to as LTE frequency bands. For example, the repeater 120 can boost signals from one or more of the LTE frequency bands: 2, 4, 5, 12, 13, 17, 25, and 26. In addition, the repeater 120 can boost selected frequency bands based on the country or region in which the repeater is used, including any of bands 1-85 or other bands, as disclosed in 3GPP TS 36.104 V16.1.0 (March 2019), and depicted in Table 1:

TABLE 1

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 (NOTE 1) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |

TABLE 1-continued

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 23[1] | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD (NOTE 2) |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD (NOTE 3, NOTE 4) |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD (NOTE 8) |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| 65 | 1920 MHz-2010 MHz | 2110 MHz-2200 MHz | FDD |
| 66 | 1710 MHz-1780 MHz | 2110 MHz-2200 MHz | FDD (NOTE 5) |
| 67 | N/A | 738 MHz-758 MHz | FDD (NOTE 2) |
| 68 | 698 MHz-728 MHz | 753 MHz-783 MHz | FDD |
| 69 | N/A | 2570 MHz-2620 MHz | FDD (NOTE 2) |
| 70 | 1695 MHz-1710 MHz | 1995 MHz-2020 MHz | FDD[6] |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD (NOTE 2) |
| 76 | N/A | 1427 MHz-1432 MHz | FDD (NOTE 2) |
| 85 | 698 MHz-716 MHz | 728 MHz-746 MHz | FDD |

(NOTE 1):
Band 6, 23 are not applicable.
(NOTE 2):
Restricted to E-UTRA operation when carrier aggregation is configured. The downlink operating band is paired with the uplink operating band (external) of the carrier aggregation configuration that is supporting the configured Pcell.
(NOTE 3):
This band is an unlicensed band restricted to licensed-assisted operation using Frame Structure Type 3.
(NOTE 4):
Band 46 is divided into four sub-bands as in Table 5.5-1A.
(NOTE 5):
The range 2180-2200 MHz of the DL operating band is restricted to E-UTRA operation when carrier aggregation is configured.
(NOTE 6):
The range 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.
(NOTE 7):
Void
(NOTE 8):
This band is restricted to licensed-assisted operation using Frame Structure Type 3.

In another configuration, the repeater 120 can boost signals from the 3GPP Technical Specification (TS) 38.104 (Release 15 Jan. 2019) bands, referred to as 5G frequency bands. In addition, the repeater 120 can boost selected frequency bands based on the country or region in which the repeater is used, including any of bands n1-n86 in frequency range 1 (FR1), n257-n261 in frequency range 2 (FR2), or other bands, as disclosed in 3GPP TS 38.104 V15.5.0 (March 2019), and depicted in Table 2 and Table 3:

TABLE 2

| NR operating band | Uplink (UL) operating band BS receive/UE transmit $F_{UL, low}$-$F_{UL, high}$ | Downlink (DL) operating band BS transmit/UE receive $F_{DL, low}$-$F_{DL, high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

TABLE 3

| NR operating band | Uplink (UL) and Downlink (DL) operating band BS transmit/receive UE transmit/receive $F_{UL, low}$-$F_{UL, high}$ $F_{DL, low}$-$F_{DL, high}$ | Duplex Mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

The number of 3GPP LTE or 5G frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

Figure 2:
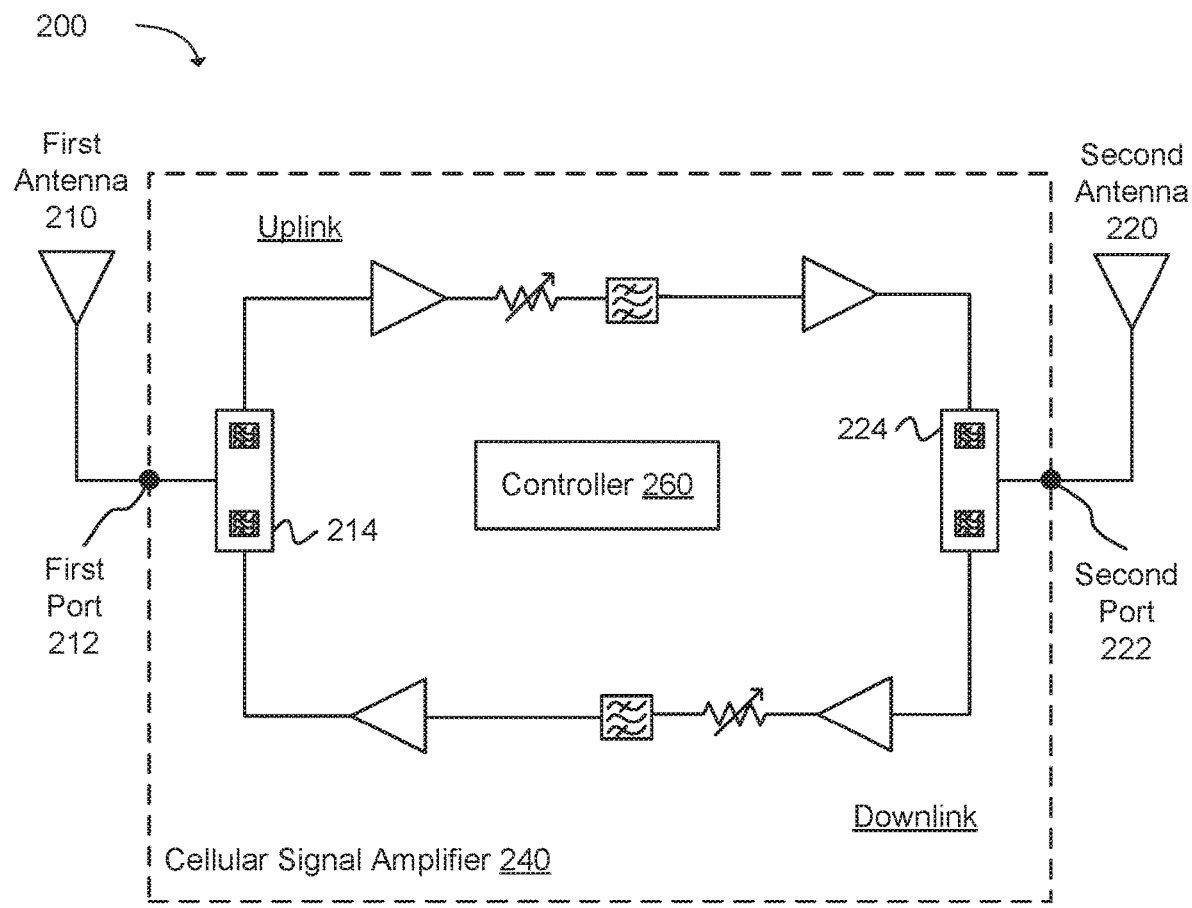
FIG. 2 illustrates a repeater in accordance with an example.

FIG. 2 illustrates an exemplary repeater 200 (or signal booster). The repeater 200 can include a first antenna 210 communicatively coupled to a first port 212, and a second antenna 220 communicatively coupled to a second port 222. For example, the first antenna 210 can be an inside antenna or server antenna, and the second antenna 220 can be an outside antenna or donor antenna. A first duplexer 214 can be communicatively coupled to the first port 212 and the first antenna 210, and a second duplexer 224 can be communicatively coupled to the second port 222 and the second antenna 220.

In one example, the repeater 200 can include an uplink signal path and a downlink signal path. The uplink signal path and the downlink signal path can be communicatively coupled between the first duplexer 214 and the second duplexer 224. In this example, the first duplexer 214 and the second duplexer 224 can be dual-input single-output (DISO) analog bandpass filters. In one example, the uplink signal path and the downlink signal path can each include one or more amplifiers (e.g., low noise amplifiers (LNAs), power amplifiers (PAs)) and one or more bandpass filters. The bandpass filters can be single-input single-output (SISO) analog bandpass filters.

In one example, the uplink signal path and the downlink signal path can each include a variable attenuator. The variable attenuator can increase or decrease an amount of attenuation for a specific band (or frequency range) in the uplink signal path or the downlink signal path, respectively. The variable attenuator can be increased in order to decrease a gain for a given band (or frequency range) in a respective signal path, or the variable attenuator can be decreased in order to increase a gain for a given band (or frequency range) in a respective signal path.

In one example, the second antenna 220 of the repeater 200 can receive a downlink signal from a base station (not shown). The downlink signal can be passed from the second antenna 220 to the second duplexer 224. The second duplexer 224 can direct the downlink signal to the downlink signal path. The downlink signal can be amplified and filtered using one or more amplifiers and one or more filters, respectively, on the downlink signal path. The downlink signal (which has been amplified and filtered) can be directed to the first duplexer 214, and then to the first antenna 210 of the repeater 200. The first antenna 210 can transmit the downlink signal to a mobile device (not shown).

In another example, the first antenna 210 can receive an uplink signal from the mobile device. The uplink signal can be passed from the first antenna 210 to the first duplexer 214. The first duplexer 214 can direct the uplink signal to the uplink signal path. The uplink signal can be amplified and filtered using one or more amplifiers and one or more filters, respectively, on the uplink signal path. The uplink signal (which has been amplified and filtered) can be directed to the second duplexer 224, and then to the second antenna 200 of the repeater 200. The second antenna 200 can transmit the uplink signal to the base station.

In one configuration, the repeater 200 can include a controller 260. The controller 260 can include a microcontroller or a discrete electrical circuit. The controller 260 can be configured to reduce oscillation in the repeater 200. Generally speaking, the oscillation can be created when the first antenna 210 and the second antenna 220 are located within a defined distance from each other, such that a level of booster amplification is greater than an antenna feedback path loss between the first and second antennas 210, 220 and a positive feedback loop exists. With repeaters, two antennas that are within a defined distance from each other can produce an RF squeal.

From an installation perspective, a customer may install repeater antennas relatively close to each other (e.g., due to constraints in a home), but a greater gain of the repeater typically necessitates that the antennas be installed further away from each other. When antennas are installed relatively close to each other, the oscillation can occur in either a downlink path or an uplink path. In some cases, downlink and/or uplink signals can be analyzed to determine the presence of or confirm an oscillation created by an amplifier in the repeater.

In one configuration, a repeater (or signal booster) can receive and transmit data on a same frequency range. When a data transmission from a transmit antenna of the repeater is picked up or detected by a receive antenna of the repeater, the repeater can oscillate and malfunction when a repeater gain exceeds a feedback path propagation loss (also known as antenna feedback path loss) of the repeater. The antenna feedback path loss can refer to the reduction in power density (attenuation) of an electromagnetic wave as it propagates through space. In other words, when the data transmission travels from the transmit antenna to the receive antenna, the reduction in power density of the data transmission can be referred to as the antenna feedback path loss. When that antenna feedback path loss is less than the repeater's gain, an oscillation can be caused in the repeater. The oscillation can overload a carrier network and cause the repeater to be ineffective.

In one example, the FCC Consumer Booster rules limit a number of oscillations for a repeater before the repeater is to be manually reset. For example, the FCC Consumer Booster rules can limit the repeater to five oscillations, at which point the repeater is to be shut down completely or manually reset. The manual reset can involve a user unplugging the repeater and plugging the repeater back in. As a result, generally when the repeater detects an oscillation, the repeater can decrease its gain or shut off completely. For example, when the oscillation is detected, the repeater can be shut off for 60-70 seconds, and when five oscillations occur, the repeater can be manually reset. The repeater does not typically try to increase its gain after the oscillation (other than applying the bump-up to check the oscillation margin) to avoid causing another oscillation. Even if the repeater does increase its gain, the repeater is still limited to the number of oscillations defined by the FCC Consumer Booster rules.

In past solutions, the repeater would initiate or force an oscillation in order to determine that the repeater oscillated, and in order to determine the oscillation margin. In other words, previous oscillation detection techniques involved initiating or forcing the oscillation. In this process, the noise floor would start to increase due to feedback paths, even before the oscillation occurred.

As an example, in past solutions, if a repeater system was installed and a user walked next to or past one of the antennas of the repeater, this might have caused an oscillation in the repeater due to a new feedback path. The repeater would trigger an oscillation and reduce its gain or shut off. In past solutions, the repeater would reduce gain or shut off and not attempt to increase the gain, in order to avoid causing an oscillation and reaching the FCC limit of five oscillations before having to manually reset. In a busy environment, users might walk by the repeater several times a day, and those kinds of disruptions would cause the repeater to operate often at the reduced gain.

In the present technology, a repeater gain and oscillation margin can be set without initiating or forcing an oscillation in the repeater. Setting the repeater gain and oscillation margin without forcing the oscillation can be beneficial for protecting the network and keeping the repeater on for an increased period of time (since the repeater is not forced to shut down after five oscillations). In addition, repeater gain and performance can be dynamically maximized, as the repeater can increase its gain when an antenna feedback path loss increases.

In the present technology, setting the repeater's gain while avoiding an oscillation can be passively done in the repeater (i.e., without initiating or forcing an oscillation), based on measurements that indicate how close the repeater is to an oscillation. For example, the repeater can measure an amount of antenna feedback path loss and a current amount of gain in the repeater. Based on the antenna feedback path loss and the current amount of gain, a maximum gain can be set for the repeater while maintaining a defined amount of oscillation margin. For example, the maximum gain level for the repeater can be set based on the antenna feedback path loss as well as a repeater gain to avoid an oscillation in the repeater, since the repeater can begin to oscillate as the antenna feedback path loss approaches the repeater gain level. By passively setting the repeater gain (i.e., not forcing an oscillation), carriers and the network can benefit, as fewer problems would be caused on the network due to oscillations in the repeater. Since an oscillation can cause a sudden and strong power and noise effect on a base station of the network, initiating or forcing oscillations is not desirable, so passively avoiding or preventing oscillations before they occur in the repeater can benefit the network. In addition, having a passive approach or solution can enable the repeater to increase its gain while being configured to identify that the gain increase will not cause an oscillation in the repeater, which is not possible with previous solutions that force an oscillation in the repeater.

In one example, the repeater can shut off or reduce its gain when there is an oscillation, but with this passive approach or solution, the repeater would be able to test whether conditions have changed. For example, the repeater can determine whether an amount of antenna feedback path loss has changed or remains the same. When the antenna feedback path loss is increased (less feedback) (e.g., there is more isolation due to an antenna being moved or an obstacle that was previously causing a reflection has since been moved), the repeater can increase its gain without fear of oscillation. As a result, the repeater can continue to operate at its maximum gain level while being configured to determine that increasing the gain will not cause an oscillation in the repeater.

In one example, the repeater can include software and/or hardware that cause the repeater to sense the feedback paths (i.e., to determine antenna feedback path loss), which can allow the repeater to operate at its maximum gain level. For example, a user can walk past an antenna of the repeater, which can cause an oscillation feedback. At a later point in time when the user is gone, the oscillation feedback would cease to exist. However, without this hardware/software detectability of the feedback paths, the repeater may not be configured to identify whether the person is there or not, and in past solutions, the repeater would not risk increasing the gain to avoid causing an oscillation. Here, with the ability to continually or periodically measure the feedback paths, the repeater can determine whether a user is present, and determine whether to increase or not increase the repeater gain while maintaining safe operation.

Figure 3:
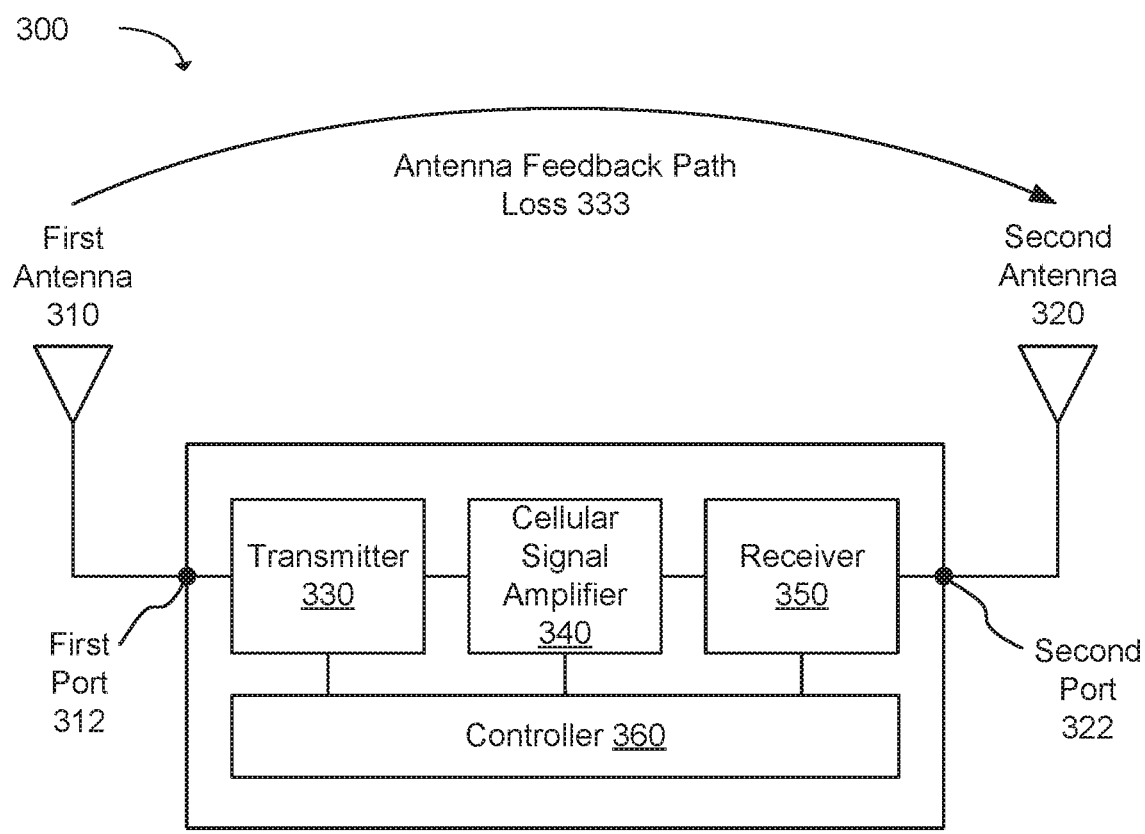
FIG. 3 illustrates a repeater operable to set a gain level based on an antenna feedback path loss in accordance with an example.

FIG. 3 illustrates an example of a repeater 300 operable to measure an antenna feedback path loss 333 and set a maximum gain level with an oscillation margin based on the antenna feedback path loss 333. The repeater 300 can be an FCC-compatible cellular signal repeater or signal booster. The antenna feedback path loss 333 can be measured for oscillation avoidance or mitigation purposes. The repeater 300 can include a first antenna 310 communicatively coupled to a first port 312, and a second antenna 320 communicatively coupled to a second port 322. For example, the first antenna 310 can be an outside antenna or donor antenna, and the second antenna 320 can be an insider antenna or server antenna, or vice versa. In this example, the first port 312 can be a donor port and the second port 322 can be a server port. The repeater 300 can include a transmitter 330 communicatively coupled to the first port 312, and a receiver 350 communicatively coupled to the second port 322. The repeater 300 can include a controller 360 that is configured to communicate with the transmitter 330 and the receiver 350.

In an alternative configuration, the repeater 300 can include a first transceiver communicatively coupled to the first port 312, and a second transceiver communicatively coupled to the second port 322. The repeater 300 can include a controller 360 that is configured to communicate with the first transceiver and the second transceiver. The first and second transceivers can be cellular transceivers or ISM transceivers.

In one example, the repeater 300 can include a cellular signal amplifier 340. The cellular signal amplifier 340 can include one or more uplink signal paths and one or more downlink signal paths. The uplink signal path(s) and the downlink signal path(s) can each include one or more amplifiers (e.g., low noise amplifiers (LNAs), power amplifiers (PAs)) and one or more bandpass filters for amplifying and filtering cellular signals, respectively.

In one example, the transmitter 330 can transmit a path loss signal to be used for measuring the antenna feedback path loss 333. The path loss signal can be transmitted on a downlink or on an uplink. The path loss signal can be a coded signal or a continuous wave (CW) signal. The path loss signal can be transmitted away from the repeater 300. The receiver 350 may detect some of the path loss signal transmitted from the transmitter 330. For example, the receiver 350 can include or be coupled to a signal detector that detects the path loss signal. The controller 360 can identify a first power level (a transmitted power) of the path loss signal transmitted from the transmitter 330. For example, the path loss signal can be transmitted at a known or predefined first power level. The controller 360 can identify a second power level (a received power) of the path loss signal received at the receiver 350. For example, a signal detector can detect the second power level of the path loss signal, and this information can be provided to the controller 360. The controller 360 can determine the antenna feedback path loss 333 (in dB) of the repeater 300 based on the first power level and the second power level (e.g., based on a difference between the first power level and the second power level). In other words, the controller 360 can subtract the transmitted power from the received power in order to calculate the antenna feedback path loss 333. The controller 360 can set a maximum gain level (in dB) for the repeater 300 that is below the antenna feedback path loss 333 by a defined oscillation margin (in dB) to avoid an oscillation in the repeater 300. The controller 360 can determine the maximum gain level by subtracting the defined oscillation margin from the calculated antenna feedback path loss 333. The antenna feedback path loss 333 should be greater than the maximum gain level to avoid an oscillation in the repeater 300.

As an example, the repeater 300 can determine that the antenna feedback path loss is 80 dB and the gain of the repeater 300 is 70 dB. In this example, the repeater 300 is operating at an acceptable gain level because there is an oscillation margin of 10 dB (i.e., the gain is subtracted from the antenna feedback path loss to determine the oscillation margin). As another example, when the calculated antenna feedback path loss is 80 dB and a current gain is 70 dB (and therefore an oscillation margin of 10 dB), but it is desirable for the repeater to have an oscillation margin of 12 dB, the repeater 300 can adjust its gain to 68 dB. In this case, in view of the antenna feedback path loss of 80 dB and the desired oscillation margin of 12 dB, the repeater 300 can reduce its current gain of 70 dB to 68 dB in order to obtain the desired oscillation margin of 12 dB. In another example, the calculated antenna feedback path loss is 71 dB and a current gain is 70 dB. In this example, the resulting oscillation margin of 1 dB can be insufficient, as it can be desirable to have at least a 5 or 6 dB oscillation margin. Therefore, the repeater 300 can determine a maximum gain level at which to operate while maintaining an oscillation margin, in view of the measured antenna feedback path loss.

In one example, the controller 360 can increase the maximum gain level when the antenna feedback path loss 333 is increased while avoiding an oscillation in the repeater 300. In other words, when the antenna feedback path loss 333 increases, the maximum gain level can also be increased while maintaining the desired oscillation margin. In another example, the controller 360 can decrease the maximum gain level when the antenna feedback path loss 333 is decreased. In other words, when the antenna feedback path loss 333 decreases, not decreasing the maximum gain level can result in an oscillation in the repeater 300.

In one example, the antenna feedback path loss 333 can indicate an amount of port-to-port system isolation. In other words, the antenna feedback path loss 333 can indicate an amount of isolation between the first antenna 310 (e.g., donor antenna) and the second antenna 320 (e.g., server antenna). The amount of isolation can account for loss on coaxial cable(s) of the repeater 333 and gain of the first and second antennas 310, 320. As a result, the antenna feedback path loss 333 can be measured between the first port 312 and the second port 322 of the repeater 300.

As an example, when a user walks by the repeater 300, this can result in a reflection that causes the controller 360 to identify a decreased antenna feedback path loss 333. When this occurs, the controller 360 can reduce the maximum gain level. When there is no user in front of or in proximity to the repeater 300 that causes the reflection, the controller 360 can identify an increased antenna feedback path loss 333. When this occurs, the controller 360 can increase the maximum gain level.

In one configuration, when the repeater 300 is initially powered on (i.e., during startup or calibration), RF signal paths in the repeater 300 can be disabled to avoid oscillations. The transmitter 330 and the receiver 350 can be initially turned on, and the antenna feedback path loss 333 can be measured (while the RF signal paths are disabled). The controller 360 can set a maximum gain level while maintaining a defined oscillation margin, in view of the measured antenna feedback path loss 333. Then the RF signal paths in the repeater 300 can be enabled. By setting the maximum gain level based on the measured antenna feedback path loss 333 upon startup, an oscillation can be avoided in the repeater 300 during startup. In other words, the repeater 300 can increase its gain based on the measured antenna feedback path loss 333 without risk of causing an oscillation in the repeater 300. The controller 360 can identify how much the gain can be increased by (e.g., 10 dB) with a confidence that the increased gain will not cause an oscillation in the repeater 300.

In one example, after startup, the controller 360 can continue to measure the antenna feedback path loss 333 over time and adjust the maximum gain level periodically as needed. For example, the controller 360 can determine subsequent antenna feedback path losses and set subsequent maximum gain levels for the repeater 300 in accordance with a defined periodicity (e.g., every few milliseconds, seconds or minutes). Therefore, the transmitter 330 and the receiver 350 can continue to periodically transmit/receive path loss signals, and the antenna feedback path losses can be measured over the period of time.

In one configuration, the controller 360 can detect patterns in calculated antenna feedback path losses over a period of time, which can enable quicker or automated repeater gain adjustments. The controller 360 can set a maximum gain level for the repeater 300 in accordance with a defined pattern of calculated feedback losses. For example, the controller 360 can determine that an antenna feedback path loss is likely to decrease at certain times of the day (e.g., due to an increased number of users in proximity to the repeater 300 and causing more reflection), based on measured antenna feedback path losses that are collected over the period of time. When the antenna feedback path loss is decreased, it is desirable to decrease the repeater's gain to avoid triggering an oscillation. In addition, the controller 360 can be configured to identify that these periods of decreased antenna feedback path loss are likely to occur for a certain period of time (e.g., 10 minutes), at which point, the antenna feedback path loss is likely to increase. When the antenna feedback path loss is increased, it is desirable to increase the repeater's gain. In this example, the controller 360 can automatically decrease the maximum gain level for the repeater 300 during this expected time period, and when this time period is over, the controller 360 can automatically increase the maximum gain level for the repeater 300.

In one example, the repeater 300 can be a marine repeater or marine signal booster, and can be included in a water vehicle (e.g., a boat). In rough waters, the repeater 300 can tip or slightly move due to waves. When the repeater 300 is tipped or slightly moved, the antenna feedback path loss 333 can change due to reflections from the water. Therefore, when the repeater 300 is tipped, the maximum gain level can be reduced due to reduced antenna feedback path losses. In one example, rhythms and patterns of increases and decreases in antenna feedback path loss due to waves can be determined over a period of time, and the controller 360 can automatically adjust (e.g., increase or decrease) the maximum gain level to account for expected increases and decreases in antenna feedback path loss. In this environment, without the ability to periodically measure the antenna feedback path loss and dynamically adjust the maximum gain level based on the antenna feedback path loss, the repeater 300 would reduce its gain and operate at that reduced gain level for an extended period of time (even when the antenna feedback path loss is later increased) to avoid causing an oscillation in the repeater 300.

In one configuration, the transmitter 330 and the receiver 350 can be an industrial, scientific, and medical (ISM) transmitter/receiver, and the path loss signal transmitted from the transmitter 330 to the receiver 350 can be an ISM path loss signal (an out of cellular band). The ISM path loss signal can be transmitted in a band or frequency range that is not a cellular band or frequency range in which the cellular signal amplifier 340 is amplifying cellular signals. As an example, the ISM transmitter/receiver can transmit/receive an ISM path loss signal on a frequency between 20 MHz and 1 GHz.

In one example, the transmitter 330 and the receiver 350 can be an ISM transmitter and an ISM receiver, respectively. In another example, the transmitter 330 and the receiver 350 can be an ISM transmitter and an ISM receiver with a mixer, and can have a common synthesizer. In yet another example, instead of an ISM transmitter and an ISM receiver, a synthesizer can be coupled to the first port 312 and a detector can be coupled to the second port 322.

In one example, an ISM path loss signal transmitted from the transmitter 330 is transmitted away from the repeater 300 and is not passed through the cellular signal amplifier 340. In the case that some of the ISM path loss signal is detected at the receiver 350, the ISM path loss signal can be filtered out and does not pass through the cellular signal amplifier 340. In other words, the cellular signal amplifier 340 can be configured to filter out ISM frequencies. As a result, the ISM path loss signal is not amplified by the cellular signal amplifier 340. The ISM path loss signal can be transmitted for a brief period of time, and a repeater transmission can be turned on while an ISM transmission occurs. Alternatively, the ISM path loss signal can be transmitted against an amplification path, so the ISM path loss signal does not become amplified through the repeater 300.

In one example, when the path loss signal transmitted from the transmitter 330 to the receiver 350 is an ISM path loss signal, the controller 360 can convert or adjust the calculated antenna feedback path loss 333 for a cellular frequency. In other words, typical signals that are passing through the cellular signal amplifier 340 are cellular signals and not ISM signals, but the calculated antenna feedback path loss 333 is for an ISM path loss signal. As a result, the calculated antenna feedback path loss 333 is not entirely accurate for cellular signals that pass through the cellular signal amplifier 340. Therefore, the controller 360 can perform a conversion to calculate an antenna feedback path loss 333 for cellular signals using the calculated antenna feedback path loss for the ISM path loss signal. In other words, the controller 360 can extrapolate the antenna feedback path loss 333 for cellular frequencies using, e.g., a straight path loss conversion technique, which can account for an antenna and/or coaxial cable delta as well.

In one example, the controller 360 can determine the antenna feedback path loss 333 for an ISM path loss signal, and extrapolate the determined antenna feedback path loss 333 to an in-band cellular frequency path loss to set the maximum gain level for the repeater 300. In other words, the controller 360 can calibrate an ISM path loss that corresponds to the antenna feedback path loss 333 to the in-band cellular frequency path loss by measuring the ISM path loss when the oscillation (e.g., a cellular oscillation) occurs in the repeater 300. In another example, as an alternative to the extrapolation technique, the controller 360 can determine an antenna feedback path loss for an out-of-band signal, and then use the antenna feedback path loss for an out-of-band frequency of the out-of-band signal to determine a second antenna feedback path loss for an in-band cellular frequency.

In another example, the repeater 300 can use multiple ISM bands (e.g., 400 MHz, 900 MHz, 2400 MHz) to increase data confidence and interpolate the antenna feedback path loss 333 instead of extrapolating the antenna feedback path loss 333. In yet another example, the antenna feedback path loss 333 can be determined based on a measured time for the ISM path loss signal to propagate and how far the ISM path loss signal travels, while calibrating out a coaxial cable propagation time.

In one configuration, the path loss signal transmitted from the transmitter 330 to the receiver 350 can be an in-band cellular signal (i.e., a path loss signal that is included in an operating cellular frequency range of the repeater 300). However, the FCC Consumer Booster rules can restrict a power level of the cellular path loss signal and an amount of time for transmitting the cellular path loss signal. The cellular path loss signal can be transmitted in a random manner, as it can be difficult to transmit the cellular path loss signal with regularity and still comply with the FCC Consumer Booster rules. As a non-limiting example, the cellular path loss signal can be transmitted randomly for approximately 10 uS about every 18 mS. As another non-limiting example, the cellular path loss signal(s) can be transmitted for not more than a total of 2 seconds every hour to comply with the FCC Code of Federal Regulations (CFR) 47 part 15 limits (irrespective of a number of individual cellular path loss signal transmissions). The cellular path loss signal can be transmitted at a reduced power level, but at a sufficient power level that is detectable and above the noise floor. The cellular path loss signal can be transmitted on the bands or frequency ranges served by the repeater 300, with the exception of certain frequency ranges (e.g., a minimal frequency range in band 4), as long as the path loss signal transmission is in accordance with the FCC Consumer Booster rules. When the cellular path loss signal is transmitted for calculating the antenna feedback path loss 333, the calculated antenna feedback path loss 333 is accurate and does not have to be extrapolated (in contrast to when an ISM path loss signal is transmitted for calculating the antenna feedback path loss 333).

In one example, when the transmitted path loss signal is an in-band cellular path loss signal, a worst-case feedback frequency can be identified during startup, which can prevent sweeping a whole band each time. In one example, a sweep of the whole band can be performed periodically. In another example, a receiver in the repeater 300 (e.g., the receiver 350) can scan for open channels and notify a transmitter in the repeater 300 (e.g., the transmitter 330) on which channel to transmit. In a further example, the repeater 300 can transmit on a downlink band only, which can minimize the potential for carrier network disruption.

In an alternative configuration, the controller 360 can detect an oscillation that occurs in the repeater 300. After the oscillation occurs, the transmitter 330 can transmit a path loss signal, which can be detected by the receiver 350. The controller 360 can identify a first power level of the path loss signal transmitted from the transmitter 330, as well as a second power level of the path loss signal received at the receiver 350. The controller 360 can determine, after the oscillation occurs in the repeater 300, an antenna feedback path loss 333 based on the first power level and the second power level (e.g., a difference between the first power level and the second power level). The controller 360 can associate the calculated antenna feedback path loss 333 with the oscillation. In other words, the controller 360 can be configured to identify that when a certain gain is applied, the repeater 300 will experience an oscillation when the antenna feedback path loss 333 reaches that calculated level. When the antenna feedback path loss 333 is below that calculated level and the certain gain is applied, the repeater 300 will not experience an oscillation. The controller 360 can set a maximum gain level for the repeater 300 that is below the antenna feedback path loss 333 (at which the controller 360 determines an oscillation will occur) by a defined oscillation margin to avoid a subsequent oscillation in the repeater 300. In this configuration, the repeater 300 can wait until an oscillation occurs, and the antenna calculated antenna feedback path loss when that oscillation occurs can serve as a baseline for selecting the maximum gain level in view of a desired oscillation margin.

In other words, in the above example, if/when the repeater 300 oscillates on a certain cellular band, an ISM path loss signal can be sent to "calibrate" the antenna feedback path loss 333 for the cellular band that experienced the oscillation. The repeater 300 can look for that antenna feedback path loss 333 and adjust a repeater gain to be below the antenna feedback path loss 333 (by a defined oscillation margin). Thus, in this alternative example, an oscillation in the repeater 300 can enable the antenna feedback path loss 333 of the repeater 300 to be calibrated.

In one example, a measured feedback loss 333 can be displayed to user via a display screen, which can aid the user during installation or for post-installation trouble-shooting. For example, a green/yellow/red indicator light can be displayed to show an amount of oscillation margin available for the repeater 300. Typically during installation, an installer would measure an amount of antenna feedback path loss, and the installer would have to plug in the repeater 300 and see whether an oscillation occurs. Here, the installer can be provided with more real-time feedback on how far away the repeater 300 is from oscillation during installation.

Figure 4:
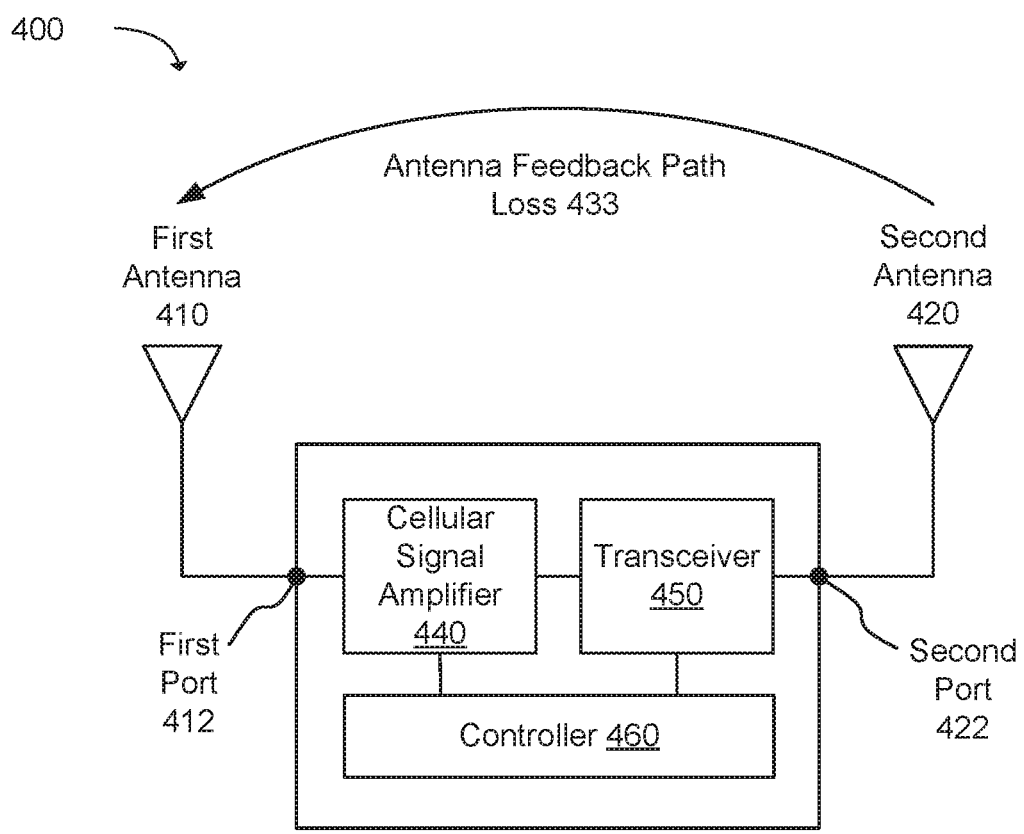
FIG. 4 illustrates a repeater operable to set a gain level based on an antenna feedback path loss in accordance with an example.

FIG. 4 illustrates an example of a repeater 400 operable to measure an antenna feedback path loss 433 and set a maximum gain level with an oscillation margin based on the antenna feedback path loss 433. The repeater 400 can include a first antenna 410 communicatively coupled to a first port 412, and a second antenna 420 communicatively coupled to a second port 422. For example, the first antenna 410 can be an outside antenna or donor antenna, and the second antenna 420 can be an insider antenna or server antenna, or vice versa. In this example, the first port 412 can be a donor port and the second port 422 can be a server port. The repeater 400 can include a transceiver 450 communicatively coupled to one of the first port 412 or the second port 422. In the example shown, the transceiver 450 is communicatively coupled to the second port 422. In addition, the repeater 400 can include a cellular signal amplifier 440 and a controller 460.

In one example, the controller 460 can identify a first power level of a path loss signal transmitted from the transceiver 450. The controller 460 can identify a second power level of the path loss signal received at the transceiver 450 through the repeater 400 (e.g., through the first antenna 410 and the cellular signal amplifier 440). The controller 460 can determine the antenna feedback path loss 433 of the repeater 400 based on the first power level and the second power level. The controller 460 can set a maximum gain level for the repeater 400 based on the antenna feedback path loss 433 to avoid an oscillation in the repeater 400.

Figure 5:
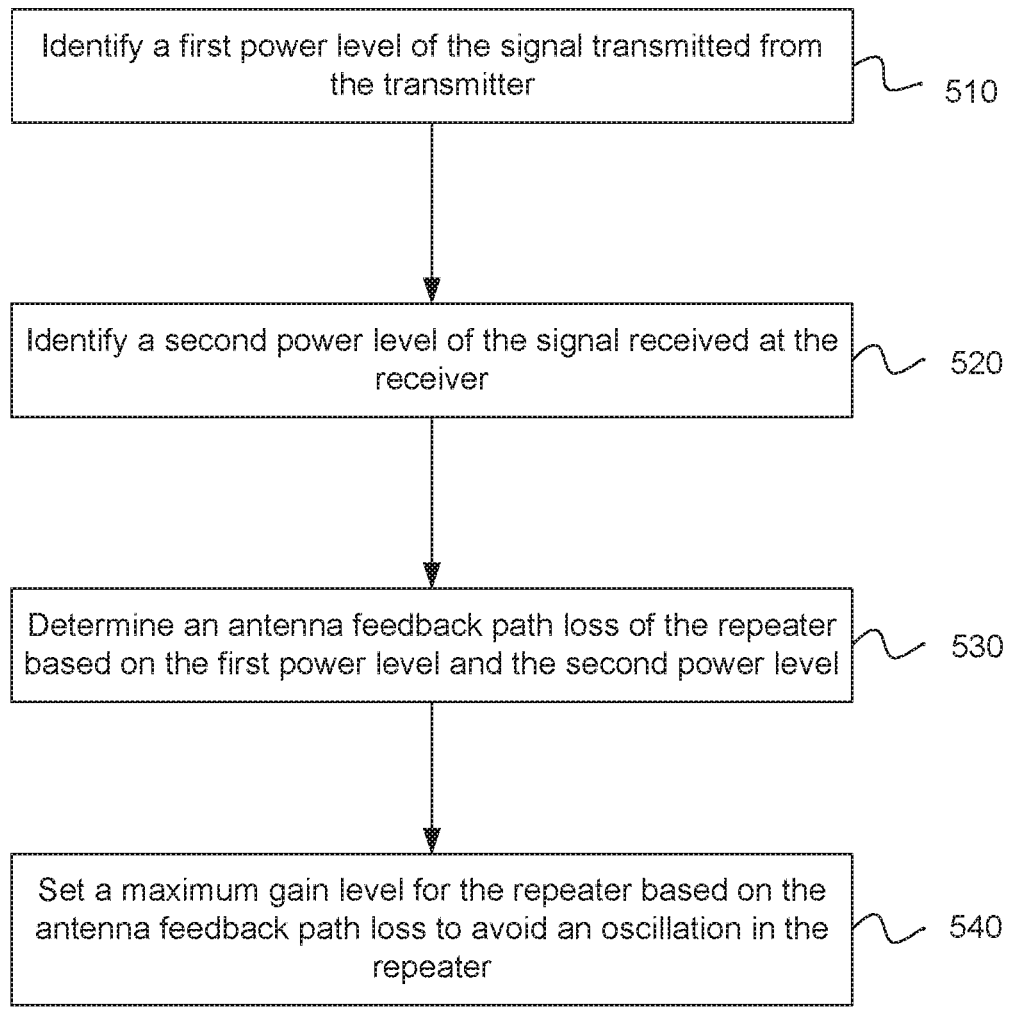
FIG. 5 depicts functionality of a repeater in accordance with an example.

FIG. 5 illustrates functionality of a repeater operable to detect antenna feedback path loss. The repeater can include a first port. The repeater can include a second port. The repeater can include a transmitter communicatively coupled to the first port. The transmitter can be configured to transmit a path loss signal. The repeater can include a receiver communicatively coupled to the second port, the receiver configured to receive the path loss signal transmitted by the transmitter. The repeater can include a controller. The controller can identify a first power level of the signal transmitted from the transmitter, as in block 510. The controller can identify a second power level of the signal received at the receiver, as in block 520. The controller can determine an antenna feedback path loss of the repeater based on the first power level and the second power level, as in block 530. The controller can set a maximum gain level for the repeater based on the antenna feedback path loss to avoid an oscillation in the repeater, as in block 540.

Figure 6:
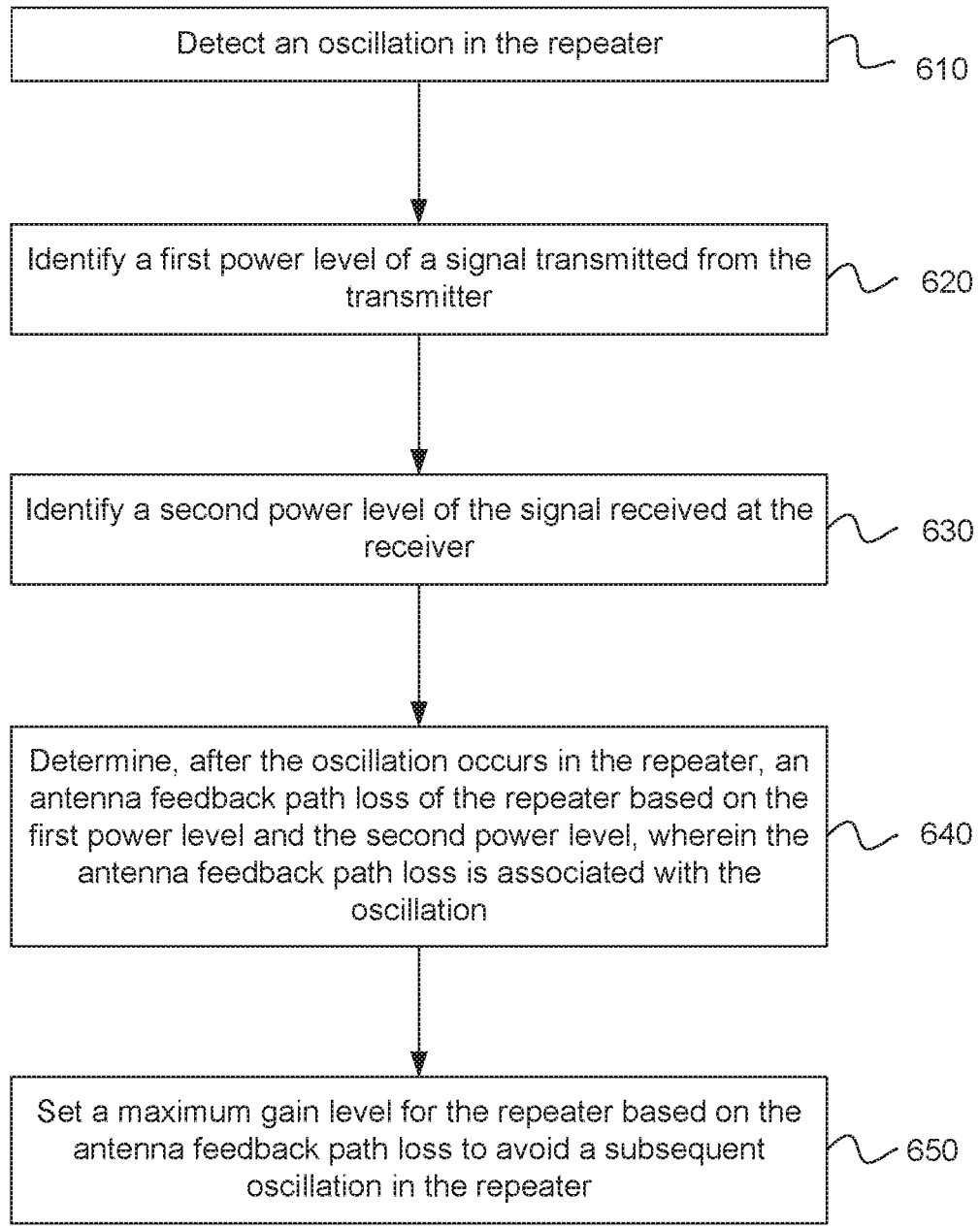
FIG. 6 depicts functionality of a repeater in accordance with an example.

FIG. 6 illustrates functionality of a repeater. The repeater can include a first port. The repeater can include a second port. The repeater can include a transmitter communicatively coupled to the first port. The repeater can include a receiver communicatively coupled to the second port. The repeater can include a controller. The controller can detect an oscillation in the repeater, as in block 610. The controller can identify a first power level of a signal transmitted from the transmitter, as in block 620. The controller can identify a second power level of the signal received at the receiver, as in block 630. The controller can determine, after the oscillation occurs in the repeater, an antenna feedback path loss of the repeater based on the first power level and the second power level, wherein the antenna feedback path loss is associated with the oscillation, as in block 640. The controller can set a maximum gain level for the repeater based on the antenna feedback path loss to avoid a subsequent oscillation in the repeater, as in block 650.

Figure 7:
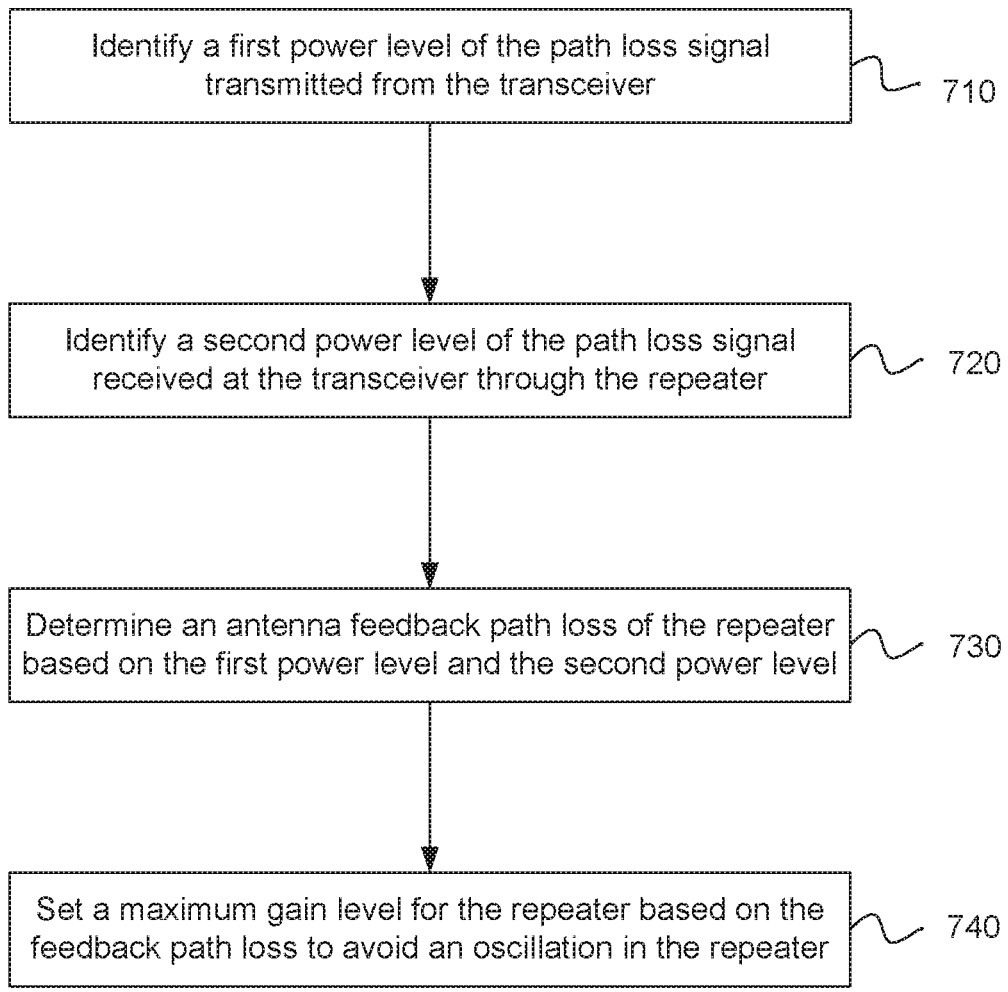
FIG. 7 depicts functionality of a repeater in accordance with an example.

FIG. 7 illustrates functionality of a repeater. The repeater can include a first port. The repeater can include a second port. The repeater can include a transceiver communicatively coupled to one of the first port or the second port. The transceiver can be configured to transmit a path loss signal and detect the path loss signal. The repeater can include a controller. The controller can identify a first power level of the path loss signal transmitted from the transceiver, as in block 710. The controller can identify a second power level of the path loss signal received at the transceiver through the repeater, as in block 720. The controller can determine an antenna feedback path loss of the repeater based on the first power level and the second power level, as in block 730. The controller can set a maximum gain level for the repeater based on the feedback path loss to avoid an oscillation in the repeater, as in block 740.

Figure 8:
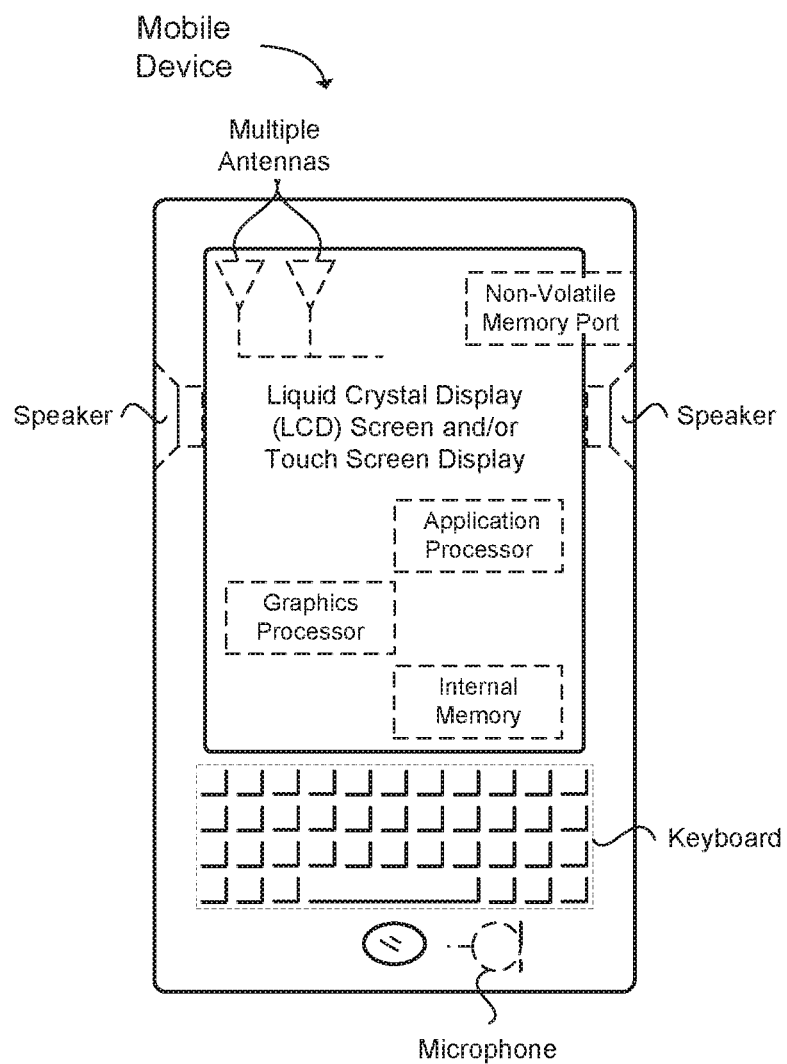
FIG. 8 illustrates a wireless device in accordance with an example.

FIG. 8 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 8 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a repeater operable to detect antenna feedback path loss, the repeater comprising: a first port; a second port; a transmitter communicatively coupled to the first port, the transmitter configured to transmit a path loss signal; a receiver communicatively coupled to the second port, the receiver configured to receive the path loss signal transmitted by the transmitter; and a controller configured to: identify a first power level of the signal transmitted from the transmitter; identify a second power level of the signal received at the receiver; determine an antenna feedback path loss of the repeater based on the first power level and the second power level; and set a maximum gain level for the repeater based in part on the antenna feedback path loss to avoid an oscillation in the repeater.

Example 2 includes the repeater of Example 1, wherein the controller is configured to set the maximum gain level for the repeater to be below a repeater oscillation level by a defined oscillation margin, wherein the repeater oscillation level is a difference between the antenna feedback path loss plus a repeater gain and the defined oscillation margin.

Example 3 includes the repeater of any of Examples 1 to 2, wherein the controller is configured to: increase the maximum gain level for the repeater when the antenna feedback path loss is increased while avoiding the oscillation in the repeater; or decrease the maximum gain level for the repeater when the antenna feedback path loss is decreased.

Example 4 includes the repeater of any of Examples 1 to 3, wherein the controller is configured to: disable one or more radio frequency (RF) signal paths of the repeater before a maximum gain level is set; and enable the one or more RF signal paths after the maximum gain level is set.

Example 5 includes the repeater of any of Examples 1 to 4, wherein the controller is configured to: determine the antenna feedback path loss and set the maximum gain level when the repeater is powered on, wherein the oscillation in the repeater is avoided when the repeater is powered on; and determine a subsequent antenna feedback path loss and set a subsequent maximum gain level for the repeater in accordance with a defined periodicity.

Example 6 includes the repeater of any of Examples 1 to 5, wherein the transmitter is configured to transmit the signal in a periodic or random manner when the path loss signal is a cellular signal, and the signal is included in an operating cellular frequency range of the repeater.

Example 7 includes the repeater of any of Examples 1 to 6, wherein the controller is configured to set the maximum gain level for the repeater in accordance with a defined pattern of antenna feedback path losses for the repeater.

Example 8 includes the repeater of any of Examples 1 to 7, wherein the signal transmitted by the transmitter and received at the receiver is an out-of-band industrial, scientific, and medical (ISM) signal or an in-band cellular signal.

Example 9 includes the repeater of any of Examples 1 to 8, wherein the controller is configured to: determine the antenna feedback path loss for an out-of-band signal; and use the antenna feedback path loss for an out-of-band frequency of the out-of-band signal to determine a second antenna feedback path loss for an in-band cellular frequency.

Example 10 includes the repeater of any of Examples 1 to 9, wherein the controller is configured to: determine multiple antenna feedback path losses based on multiple out-of-band signals transmitted by the transmitter and received at the receiver; and interpolate the determined multiple antenna feedback path losses to an in-band cellular frequency path loss to set the maximum gain level for the repeater.

Example 11 includes the repeater of any of Examples 1 to 10, further comprising: a first antenna communicatively coupled to the first port, the path loss signal being transmitted from the transmitter via the first antenna; and a second antenna communicatively coupled to the second port, the path loss signal being received at the receiver via the second antenna.

Example 12 includes the repeater of any of Examples 1 to 11, wherein the repeater is a Federal Communications Commission (FCC)-compatible cellular signal repeater.

Example 13 includes the repeater of any of Examples 1 to 12, wherein the path loss signal is transmitted in a downlink.

Example 14 includes the repeater of any of Examples 1 to 13, further comprising an indication to show an amount of oscillation margin available for the repeater based on the antenna feedback path loss and the maximum gain level set for the repeater.

Example 15 includes the repeater of any of Examples 1 to 14, wherein: the receiver is further configured to scan for open channels; and the transmitter is further configured to transmit the path loss signal on one of the open channels.

Example 16 includes a repeater, comprising: a first port; a second port; a transmitter communicatively coupled to the first port; a receiver communicatively coupled to the second port; and a controller configured to: detect an oscillation in the repeater; identify a first power level of a signal transmitted from the transmitter, wherein the signal is a licensed or unlicensed radio frequency (RF) signal; identify a second power level of the signal received at the receiver; determine, after the oscillation occurs in the repeater, an antenna feedback path loss of the repeater based on the first power level and the second power level, wherein the antenna feedback path loss is associated with the oscillation; and set a maximum gain level for the repeater based in part on the antenna feedback path loss to avoid a subsequent oscillation in the repeater.

Example 17 includes the repeater of Example 16, wherein the controller is configured to set the maximum gain level for the repeater to be below a repeater oscillation level by a defined oscillation margin, wherein the repeater oscillation level is a difference between the antenna feedback path loss plus a repeater gain and the defined oscillation margin.

Example 18 includes the repeater of any of Examples 16 to 17, wherein the controller is configured to: increase the maximum gain level for the repeater when the antenna feedback path loss is increased while avoiding the subsequent oscillation in the repeater; or decrease the maximum gain level for the repeater when the antenna feedback path loss is decreased.

Example 19 includes the repeater of any of Examples 16 to 18, wherein the controller is configured to determine a subsequent antenna feedback path loss and set a subsequent maximum gain level for the repeater in accordance with a defined periodicity.

Example 20 includes the repeater of any of Examples 16 to 19, wherein the signal transmitted by the transmitter and received at the receiver is an industrial, scientific, and medical (ISM) signal or a cellular signal.

Example 21 includes the repeater of any of Examples 16 to 20, wherein the transmitter is configured to transmit the signal and the receiver is configured to receive the signal after the oscillation occurs in the repeater.

Example 22 includes the repeater of any of Examples 16 to 21, wherein the controller is configured to: determine the antenna feedback path loss for an out-of-band signal; and use the antenna feedback path loss for an out-of-band frequency of the out-of-band signal to determine a second antenna feedback path loss for an in-band cellular frequency.

Example 23 includes the repeater of any of Examples 16 to 22, wherein the controller is configured to calibrate an ISM path loss that corresponds to the antenna feedback path loss to the in-band cellular frequency path loss by measuring the ISM path loss when the oscillation occurs in the repeater, wherein the oscillation is a cellular oscillation.

Example 24 includes a repeater, comprising: a first port; a second port; a transceiver communicatively coupled to one of the first port or the second port, the transceiver configured to transmit a path loss signal and detect the path loss signal; and a controller configured to: identify a first power level of the path loss signal transmitted from the transceiver; identify a second power level of the path loss signal received at the transceiver through the repeater; determine an antenna feedback path loss of the repeater based on the first power level and the second power level; and set a maximum gain level for the repeater based in part on the feedback path loss to avoid an oscillation in the repeater.

Example 25 includes the repeater of Example 24, wherein the path loss signal is an in-band cellular signal.

Example 26 includes the repeater of any of Examples 24 to 25, wherein the transceiver is configured to transmit the path loss signal at a power level permitted under Federal Communications Commission (FCC) Code of Federal Regulations (CFR) 47 Part 15.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater operable to detect antenna feedback path loss, the repeater comprising:
   a first port;
   a second port;
   a transmitter communicatively coupled to the first port, the transmitter configured to transmit a path loss signal;
   a receiver communicatively coupled to the second port, the receiver configured to receive the path loss signal transmitted by the transmitter; and
   a controller configured to:
   identify a first power level of the signal transmitted from the transmitter;
   identify a second power level of the signal received at the receiver;
   determine an antenna feedback path loss of the repeater based on the first power level and the second power level; and
   set a maximum gain level for the repeater based in part on the antenna feedback path loss to avoid an oscillation in the repeater,
   wherein the controller is configured to set the maximum gain level for the repeater to be below a repeater oscillation level by a defined oscillation margin, wherein the repeater oscillation level is a difference between the antenna feedback path loss plus a repeater gain and the defined oscillation margin.

2. The repeater of claim 1, wherein the controller is configured to:
   increase the maximum gain level for the repeater when the antenna feedback path loss is increased while avoiding the oscillation in the repeater; or
   decrease the maximum gain level for the repeater when the antenna feedback path loss is decreased.

3. The repeater of claim 1, wherein the controller is configured to:
   disable one or more radio frequency (RF) signal paths of the repeater before a maximum gain level is set; and
   enable the one or more RF signal paths after the maximum gain level is set.

4. The repeater of claim 1, wherein the controller is configured to:
   determine the antenna feedback path loss and set the maximum gain level when the repeater is powered on, wherein the oscillation in the repeater is avoided when the repeater is powered on; and
   determine a subsequent antenna feedback path loss and set a subsequent maximum gain level for the repeater in accordance with a defined periodicity.

5. The repeater of claim 1, wherein the transmitter is configured to transmit the signal in a periodic or random manner when the path loss signal is a cellular signal, and the signal is included in an operating cellular frequency range of the repeater.

6. The repeater of claim 1, wherein the controller is configured to set the maximum gain level for the repeater in accordance with a defined pattern of antenna feedback path losses for the repeater.

7. The repeater of claim 1, wherein the signal transmitted by the transmitter and received at the receiver is an out-of-band industrial, scientific, and medical (ISM) signal or an in-band cellular signal.

8. The repeater of claim 1, wherein the controller is configured to:
   determine the antenna feedback path loss for an out-of-band signal; and
   use the antenna feedback path loss for an out-of-band frequency of the out-of-band signal to determine a second antenna feedback path loss for an in-band cellular frequency.

9. The repeater of claim 1, wherein the controller is configured to:
   determine multiple antenna feedback path losses based on multiple out-of-band signals transmitted by the transmitter and received at the receiver; and
   interpolate the determined multiple antenna feedback path losses to an in-band cellular frequency path loss to set the maximum gain level for the repeater.

10. The repeater of claim 1, further comprising:
    a first antenna communicatively coupled to the first port, the path loss signal being transmitted from the transmitter via the first antenna; and
    a second antenna communicatively coupled to the second port, the path loss signal being received at the receiver via the second antenna.

11. The repeater of claim 1, wherein the repeater is a Federal Communications Commission (FCC)-compatible cellular signal repeater.

12. The repeater of claim 1, wherein the path loss signal is transmitted in a downlink.

13. The repeater of claim 1, further comprising an indication to show an amount of oscillation margin available for the repeater based on the antenna feedback path loss and the maximum gain level set for the repeater.

14. The repeater of claim 1, wherein:
    the receiver is further configured to scan for open channels; and
    the transmitter is further configured to transmit the path loss signal on one of the open channels.

15. A repeater, comprising:
    a first port;
    a second port;
    a transmitter communicatively coupled to the first port;
    a receiver communicatively coupled to the second port; and a controller configured to:
detect an oscillation in the repeater;
identify a first power level of a signal transmitted from the transmitter, wherein the signal is a licensed or unlicensed radio frequency (RF) signal;
identify a second power level of the signal received at the receiver;
determine, after the oscillation occurs in the repeater, an antenna feedback path loss of the repeater based on the first power level and the second power level, wherein the antenna feedback path loss is associated with the oscillation; and
set a maximum gain level for the repeater based in part on the antenna feedback path loss to avoid a subsequent oscillation in the repeater,
wherein the controller is configured to:
disable one or more radio frequency (RF) signal paths of the repeater before a maximum gain level is set; and
enable the one or more RF signal paths after the maximum gain level is set.

16. The repeater of claim 15, wherein the controller is configured to set the maximum gain level for the repeater to be below a repeater oscillation level by a defined oscillation margin, wherein the repeater oscillation level is a difference between the antenna feedback path loss plus a repeater gain and the defined oscillation margin.

17. The repeater of claim 15, wherein the controller is configured to:
increase the maximum gain level for the repeater when the antenna feedback path loss is increased while avoiding the subsequent oscillation in the repeater; or
decrease the maximum gain level for the repeater when the antenna feedback path loss is decreased.

18. The repeater of claim 15, wherein the controller is configured to determine a subsequent antenna feedback path loss and set a subsequent maximum gain level for the repeater in accordance with a defined periodicity.

19. The repeater of claim 15, wherein the signal transmitted by the transmitter and received at the receiver is an industrial, scientific, and medical (ISM) signal or a cellular signal.

20. The repeater of claim 15, wherein the transmitter is configured to transmit the signal and the receiver is configured to receive the signal after the oscillation occurs in the repeater.

21. The repeater of claim 15, wherein the controller is configured to:
determine the antenna feedback path loss for an out-of-band signal; and
use the antenna feedback path loss for an out-of-band frequency of the out-of-band signal to determine a second antenna feedback path loss for an in-band cellular frequency.

22. The repeater of claim 21, wherein the controller is configured to calibrate an ISM path loss that corresponds to the antenna feedback path loss to the in-band cellular frequency path loss by measuring the ISM path loss when the oscillation occurs in the repeater, wherein the oscillation is a cellular oscillation.

23. A repeater, comprising:
a first port;
a second port;
a transceiver communicatively coupled to one of the first port or the second port, the transceiver configured to transmit a path loss signal and detect the path loss signal; and
a controller configured to:
identify a first power level of the path loss signal transmitted from the transceiver;
identify a second power level of the path loss signal received at the transceiver through the repeater;
determine an antenna feedback path loss of the repeater based on the first power level and the second power level;
determine the antenna feedback path loss for an out-of-band signal; and
use the antenna feedback path loss for an out-of-band frequency of the out-of-band signal to determine a second antenna feedback path loss for an in-band cellular frequency; and
set a maximum gain level for the repeater based in part on the feedback path loss to avoid an oscillation in the repeater.

24. The repeater of claim 23, wherein the path loss signal is an in-band cellular signal.

25. The repeater of claim 23, wherein the transceiver is configured to transmit the path loss signal at a power level permitted under Federal Communications Commission (FCC) Code of Federal Regulations (CFR) 47 Part 15.

26. A repeater operable to detect antenna feedback path loss, the repeater comprising:
a first port;
a second port;
a transmitter communicatively coupled to the first port, the transmitter configured to transmit a path loss signal;
a receiver communicatively coupled to the second port, the receiver configured to receive the path loss signal transmitted by the transmitter; and
a controller configured to:
identify a first power level of the signal transmitted from the transmitter;
identify a second power level of the signal received at the receiver;
determine an antenna feedback path loss of the repeater based on the first power level and the second power level; and
set a maximum gain level for the repeater based in part on the antenna feedback path loss to avoid an oscillation in the repeater; and
an indication to show an amount of oscillation margin available for the repeater based on the antenna feedback path loss and the maximum gain level set for the repeater.

* * * * *